J. A. KNOX.
TOOL FOR CLEANING OIL CUPS.
APPLICATION FILED JAN. 24, 1906.
903,582.
Patented Nov. 10, 1908.
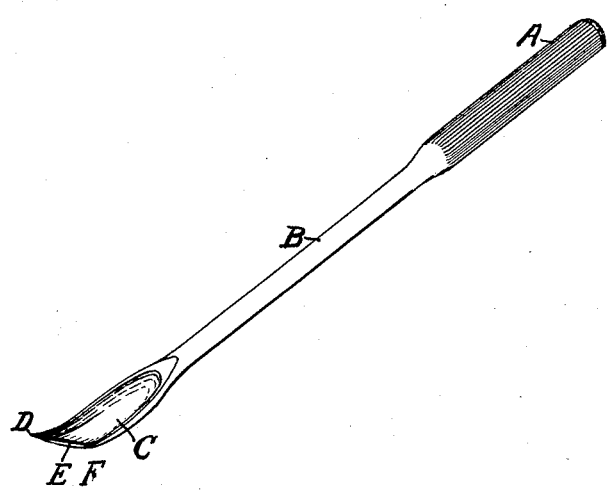
WITNESSES:
INVENTOR
John A. Knox
BY
Ward & Cameron
ATTORNEY

_
UNITED STATES PATENT OFFICE.

JOHN A. KNOX, OF RENSSELAER, NEW YORK.

TOOL FOR CLEANING OIL-CUPS.

No. 903,582.

Specification of Letters Patent.

Patented Nov. 10, 1908.

Application filed January 24, 1906. Serial No. 297,565.

*To all whom it may concern:*

Be it known that I, JOHN A. KNOX, a citizen of the United States, residing at the city of Rensselaer, in the county of Rensselaer and State of New York, have invented certain new and useful Improvements in Tools for Cleaning Oil-Cups, of which the following is a specification.

My invention relates to devices for cleaning oil cups in machinery, and the object of my invention is to provide a convenient, cheap and handy tool by which dirt and dregs may be readily cleaned from oil cups, especially in machine shops and farm machinery. I accomplish this object by means of a tool made as represented in the accompanying drawing.

A is the handle of the tool which may be somewhat larger than the shank, B. At the end of the shank, B, I construct a scoop or spoon, C, made broader than the shank, B, and hollowed out as shown, with one corner, D, elongated so as to reach in the holes of the oil cup or in the crevices, corners and extremities of the oil cup. I make the end, E, beveled or slanting so that the angle at the point, D, will be a sharp acute angle and the end, E, is slightly turned up so as to scoop up and retain the material clinging to the sides and bottom of the oil cup and the corner, F, will be an obtuse angle. The sides forming the angle, D, are substantially straight lines, but the outside line forming the side of the scoop has a slightly vertical curve to form the scoop, and also diverges outwardly to form the acute elongated angle, D.

The sides of the scoop, C, turn upward and slightly inward, much as an ordinary table spoon, having no cutting edge and is not intended to cut anything but to scoop out the loose material from the oil cup.

I make the spoon part, C, slightly twisted so that by taking the tool by the handle, A, and inserting the scoop-end in the cup and twisting, it will more readily take up any material in the cup, with the scoop-end of the tool and bring it out of the cup.

The top edges of the sides of the scoop and the angular or scraping edge therefore all lie in substantially the same plane thus providing a perfect cavity or recess whereby the cleanings may be readily held therein when the instrument is being removed from the oil cup, this construction further aids in the cleaning operation by reason of the number and arrangement of edges that may be utilized in the cleaning.

What I claim as my invention and desire to secure by Letters Patent is:—

A tool of the character described comprising a scoop and a handle, said scoop having substantially parallel upturned sides, an upturned scraping edge disposed at an angle to said sides and forming therewith acute and obtuse angles respectively and lying in substantially the same plane as the upper edges of said sides.

In testimony whereof I have affixed my signature in presence of two witnesses.

JOHN A. KNOX.

Witnesses:
 WALTER E. WARD,
 LUEIALE DAMARELL.